3,340,330
BIS-MERCAPTOALKYLENE SPIROPHOS-
PHORODITHIOATES
Rudi F. W. Rätz, Hamden, and Arthur D. Bliss, Guilford,
Conn., assignors to Olin Mathieson Chemical Corporation, New Haven, Conn., a corporation of Virginia
No Drawing. Filed May 19, 1964, Ser. No. 368,686
20 Claims. (Cl. 260—927)

ABSTRACT OF THE DISCLOSURE

Bis-mercaptoalkylene spirophosphorodithioates are provided in high yield and purity by the reaction of pentaerythritol bis-hydrogen thiophosphite with merecaptoalkylene thiocyanates in selected solvent and in the presence of a basic catalyst.

---

This invention relates to bis-mercaptoalkylene spirophosphorodithioates having the general formula:

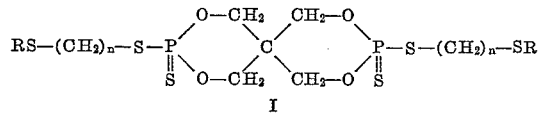

I

R being hydrogen, an aliphatic hydrocarbon, substituted aliphatic hydrocarbon, cycloaliphatic, substituted cycloaliphatic, aryl, substituted aryl, or a heterocyclic group; and wherein $n$ is an integer from 1–3.

Lucas et al. in Am. Chem. Soc., 72, 5491 (1950) have described the preparation of 3,9-dichloro-2,4,8,10-tetraoxa-3,9-diphosphaspiro[5.5]undecane by the reaction of pentaerythritol with phosphorus trichloride. This derivative reacts with hydrogen sulfide as shown in Example 1 hereinafter to provide 3,9-H-2,4,8,10-tetraoxa-3,9-diphosphaspiro[5.5]undecane-3,9-disulfide. This latter compound may also be referred to as pentaerythritol bis-hydrogen thiophosphite and has the following formula:

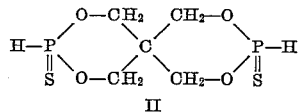

II

It has now been found that the bifunctional pentaerythritol bis-hydrogen thiophosphite is a useful intermediate in the prepartion of the aforementioned bis-mercaptoalkylene spirophosphorodithioates. The thiophosphite reacts with a number of substituted alkyl thiocyanates, hereinafter referred to as mercaptoalkylene thiocyanates, to provide the derivatives (I) in accordance with the following equation:

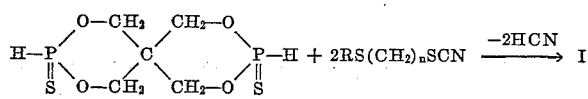

R and $n$ being as hereinbefore defined.

The mercaptoalkylene thiocyanates which can be used as reactants in the above equation are provided by well known procedures. Thus for example, simple mercaptans can be converted to alkyl haloalkyl thioethers and aryl haloalkyl thioethers by reacting the mercaptans with alkylene dihalides in a basic medium, by chloromethylating the mercaptans with formaldehyde and hydrogen chloride, or by reacting the mercaptans with alkylene chlorohydrins in a basic medium and treating the resulting hydroxyalkyl compounds with thionyl chloride to obtain the desired chloroalkyl compounds. Preparations of this nature are disclosed by Böhme et al. in Ann., 563, 62 (1949) and Ford-Moore et al. in J. Chem. Soc., 1755 (1949). The resulting thioethers are readily converted to the desired mercaptoalkylene thiocyanates by reacting them with an inorganic thiocyanate as shown, for example, by Kretov, et al., J. Gen. Chem. (U.S.S.R.), 7, 2009 (1937). Examples 2 and 3 hereinafter are illustrative of this latter step. In summary, R in the general Formula I corresponds to R in the mercaptoalkylene thiocyanate reactant.

Therefore, a wide variety of mercaptoalkylene thiocyanates [RS(CH$_2$)$_n$SCN] can be reacted with the thiophosphite in accordance with this invention. Particularly useful compounds (I) are provided wherein R in the thiocyanate reactant is an alkyl group having 1–18 carbon atoms. Thus, suitable mercaptoalkylene thiocyanates which may be used as reactants include those wherein R is methyl, ethyl, n-propyl, isopropyl, n-butyl, isobutyl, sec. butyl, tert. butyl, n-amyl, isoamyl, 2-methylbutyl, 3-pentyl, n-hexyl, sec. hexyl, 3-hexyl, n-heptyl, 4-heptyl, 2,4-dimethyl-3-pentyl, n-octyl, iso-octyl, 2-ethylhexyl, tert. octyl, n-nonyl, 5-nonyl, 2,6-dimethyl-4-heptyl, n-decyl, n-undecyl, n-dodecyl, 4-butyl octyl, 6-dodecyl, 2-methyl-2-undecyl, tert. dodecyl, n-tridecyl, n-tetradecyl, cetyl, and n-octadecyl. These reactants are provided from the corresponding mercaptans by the aforementioned synthetic processes.

Similarly, mercaptoalkylene thiocyanates wherein R represents an alkenyl radical having 3–5 carbon atoms can also be utilized as reactants in the process disclosed herein. For example, mercaptoalkylene thiocyanates wherein R is allyl, crotyl, 1-butenyl, methallyl, 1-pentenyl and 2-isopentenyl can be utilized to provide compounds of the general Formula I.

Bis-mercaptoalkylene spirophosphorodithioates (I) wherein R is an alkoxyalkyl radical having 2–8 carbon atoms or an aryloxyalkyl radical having 7–9 carbon atoms are also provided by this invention. For instance, mercaptoalkylene thiocyanates of the type RS(CH$_2$)$_n$SCN wherein R represents methoxymethyl, ethoxymethyl, n-butoxymethyl, β-methoxyethyl, β,β-dimethoxyethyl, β-ethoxyethyl, β,β-diethoxyethyl, β-propoxyethyl, β-n-butoxyethyl, β,cyclohexyloxyethyl, β-phenoxyethyl, and β-tolyloxyethyl react with the bifunctional thiophosphite (II) to yield the substituted spirophosphorodithioates of this invention.

The compound (I) wherein R is a hydrogen atom is also prepared by the reaction of pentaerythritol bis-hydrogen thiophosphite with β-mercaptoethyl thiocyanate. This reactant (NCSCH$_2$CH$_2$SH) is a known compound prepared by the reaction of ethylene sulfide and hydrogen chloride and treatment of the resulting β-chloroethyl mercaptan with an alkali metal thiocyanate.

Mercaptoalkylene thiocyanates wherein R represents a cycloaliphatic radical having 5–8 carbon atoms are also reacted with the thiophosphite to provide derivatives of the Formula I. For example, mercaptoalkylene thiocyanates wherein R is cyclopentyl, cyclohexyl, cyclopentylmethyl, cycloheptyl, 3-methylcyclopentylmethyl, 2-methylcyclohexyl, 3-methylcyclohexyl, 4-methylcyclohexyl, 1-cyclopentenyl, 2-cyclohexenyl, and β-cyclohexylethyl are useful as reactants in the practice of this invention.

Bis-mercaptoalkylene spirophosphorodithioates (I) wherein R is aryl having 6–10 carbon atoms or aralkyl having 7–9 carbon atoms are also readily prepared by the reaction of the bifunctional thiophosphite with appropriate thiocyanates. For example, mercaptoalkylene thiocyanates wherein R is phenyl, α-naphthyl, β-naphthyl, o-cresyl, m-cresyl, p-cresyl, o-ethylphenyl, p-ethylphenyl, 2,4-xylyl, 2,5-xylyl, o-propylphenyl, o-isopropylphenyl, benzyl, α-phenylethyl, β-phenylethyl, α-phenylpropyl, γ-phenylpropyl, and o-methylbenzyl can be used to provide compounds of the Formula I.

Similarly, bis-mercaptoalkylene spirophosphorodithioates (I) wherein R is halogenated phenyl and nitrated phenyl are provided by this invention. Suitable mercaptoalkylene thiocyanates $RS(CH_2)_{1-3}SCN$ which may be utilized in the preparation of these derivatives include those wherein R is o-chlorophenyl, m-chlorophenyl, p-chlorophenyl, o-bromophenyl, m-bromophenyl, p-bromophenyl, o-iodophenyl, m-iodophenyl, p-iodophenyl, 2,5-dichlorophenyl, o-nitrophenyl, m-nitrophenyl, p-nitrophenyl, 2,4-dinitrophenyl, 2,4,6-trinitrophenyl, 2,4-nitrobromophenyl, 2,4-nitrochlorophenyl and 2,5-nitrochlorophenyl.

The derivatives (I) wherein R represents a heterocyclic group are also obtained as a result of this invention. For example, R may represent a furfuryl or thiophene group either unsubstituted or having lower alkyl substituents thereon. The mercaptoalkylene thiocyanates which react with the thiophosphite to provide these derivatives are prepared from the corresponding mercaptans by the process previously disclosed herein.

Other bis-mercaptoalkylene spirophosphorodithioates included in the general Formula I can also be prepared in a similar fashion. Substituted thiocyanates of the formula $RS(CH_2)_{1-3}SCN$ wherein R is, for example, 2-nitro-p-tolyl, o-chlorobenzyl, 2,4-dichlorobenzyl, 3,4-dichlorobenzyl, p-bromobenzyl, α-phenyl-p-chlorobenzyl, cinnamyl, 4-chloro-α-naphthyl, 4-bromo-α-naphthyl, 2-nitro-α-naphthyl, 4-nitro-α-naphthyl, 5-nitro-α-naphthyl, and 1-nitro-β-naphthyl can also be utilized to provide the desired spirophosphorodithioates.

The reaction of the pentaerythritol bis-hydrogen thiophosphite with the mercaptoalkylene thiocyanates must be performed under controlled experimental conditions in order to provide the spirophosphorodithioates (I) in high yield and purity.

Thus, selected solvents must be employed in the process of this invention in order to obtain the derivatives (I). Specifically an aliphatic carboxylic acid N,N-dialkyl amide solvent must be utilized. Particularly useful solvents are the lower alkyl substituted derivatives of formamide and acetamide, and in this respect dimethylformamide and dimethylacetamide are preferred solvents.

A basic catalyst must also be employed in the spirophosphorodithioate preparations. A wide variety of bases may be suitably utilized as the required catalysts, although it is preferred to use the alkali metal alkoxides. Other suitable basic catalysts include tertiary amines, particularly those having less than thirteen carbon atoms, alkali metal hydroxides and the alkali metal cyanides. The amount of catalyst employed may be varied depending upon the reaction rate desired, but generally about 1–3% by weight of the catalyst based on weight of thiophosphite reactant can be advantageously used.

Although the preparations described herein may be performed at reaction temperatures of up to about 100° C., it is preferred to operate at a reaction temperature of less than about 50° C.

The following detailed examples will serve to illustrate the practice of this invention. Example 1 describes the preparation of the bifunctional thiophosphite reactant while Examples 2 and 3 are illustrative of mercaptoalkylene thiocyanate preparation. The remaining examples are presented to illustrate spirophosphorodithioate preparation, and it is understood that they are not to be taken as limiting the scope of this invention.

EXAMPLE 1

A solution of 10.0 g. of 3,9-dichloro-2,4,8,10-tetraoxa-3,9-diphosphaspiro[5.5]undecane in 30 ml. of cold dimethylacetamide was prepared and placed in a 100 ml. two necked flask equipped with gas inlet tube and condenser. The condenser was connected with a calcium chloride tube for moisture protection. A moderate stream of dry hydrogen sulfide was passed into the solution for 30 minutes while the flask was immersed in an ice-water bath. Separation of dimethylacetamide hydrochloride started after 10 minutes, and 6.0 g. of this salt was obtained after 30 minutes. Continuation of the hydrogen sulfide treatment for another 30 minutes did not cause further hydrochloride separation. Another crop of 1.2 g. however was obtained after storage for two days of the solution at −15° C. Thus, a total of 7.2 g. of hydrochloride was obtained as compared with the theoretical amount of 9.35 g. The desired product was precipitated from solution by the addition of 50 ml. of water, and the resulting white, somewhat tacky material was collected by filtration. The dried solid product was obtained in an amount of 4.5 g. This crude material gave a negative Beilstein test and proved also to be chlorine free as demonstrated by sodium fusion. The preferred recrystallization solvent was o-dichlorobenzene, but glacial acetic acid and xylene could also be used for recrystallization. The crystals obtained from o-dichlorobenzene melted at 204°–205° C., those from glacial acetic acid at 199°–201° C. They were readily soluble in acetone, sparingly soluble in ether, and insoluble in water. The following analytical data revealed that the desired 3,9-H-2,4,8,10-tetraoxa - 3,9 - diphosphaspiro[5.5]undecane - 3,9 - disulfide had been obtained. Yield: 46%.

*Analysis.*—Calcd. for $C_5H_{10}O_4P_2S_2$: C, 23.05; H, 3.85; P, 23.83; S, 24.60. Found: C, 23.08; H, 3.97; P, 23.3; S, 24.19.

The product was dissolved in acetone, and nuclear magnetic resonance studies were conducted on the solution. The spectrum was consistent with the structure (II), and it showed the presence of P–H coupling (618 cycles). There was no indication of the P–SH coupling which would be found in the possible tautomeric thiol.

An infrared spectrum indicated the presence of phosphorus-hydrogen linkage by a strong absorption at 4.2μ.

EXAMPLE 2

To a solution of 25 g. of potassium thiocyanate in 250 ml. of acetone was added 37.3 g. (0.2 mole) of 3-chloropropyl phenyl sulfide. The solution was refluxed for 4 days, then cooled and filtered. The potassium chloride formed amounted to 12.8 g. (86%). Acetone was removed from the filtrate at reduced pressure, and the yellow liquid residue was distilled. There was obtained 6.6 g. boiling at 105°–115° C./1.5 mm. and 28.3 g. (68%) boiling at 140°–141° C./0.5 mm. Infrared analysis showed the first fraction to consist of unchanged 3-chloropropyl phenyl sulfide and the second fraction to be the desired γ-(phenylthio)propyl thiocyanate. The compound is reported to boil at 176°–178° C./3 mm. by A. E. Kretov et al., J. Gen. Chem. (U.S.S.R.), 7, 2009 (1937).

EXAMPLE 3

Using the procedure of Example 2, β-(methylthio)-ethyl thiocyanate was prepared in 54% yield from 10 g. of 2-chloroethyl methyl sulfide and 8.8 g. of potassium thiocyanate in 75 ml. of acetone. The product boiled at 98°–100° C./4 mm.

EXAMPLE 4

A 125 ml. Erlenmeyer flask was charged with 3.90 g. (.015 mole) of 3,9-H-2,4,8,10-tetraoxa-3,9-diphosphaspiro[5.5]undecane-3,9-disulfide and 4.83 g. (0.03 mole) of γ-(ethylthio)propyl thiocyanate. The mixture was dissolved in 50 ml. of anhydrous N,N-dimethylacetamide, stirred magnetically and treated with a catalytic amount of sodium methylate. A transient yellow color appeared for a few seconds. The mixture then warmed spontaneously to about 40°–45° C. and hydrogen cyanide began to evolve. After about 3 minutes, a small amount of white precipitate began to appear. After 10 minutes, the mixture had cooled to room temperature. Another small portion of sodium methylate was added and the mixture stirred for 5 minutes, but no further evidence of reaction was observed. The reaction mixture was poured into 250 ml. of cold water producing a fine white solid. The solid was removed by filtration, washed with water, then with ethanol and dried. The crude product weighed 7.21 g. (92%), melted at 168°–170° C. and had a slight odor of the thiocyanate. One recrystallization from acetone gave 5.73 g. of odorless white plates melting at 169°–170° C. Concentration of the filtrate produced an additional 0.94 g., melting at 168°–169° C. The following analytical data revealed that 3,9-bis(γ-[ethylthio]propylthio)-2,4,8,10-tetraoxa-3,9-diphosphaspiro[5.5]undecane-3,9-disulfide had been obtained in high purity.

Analysis.—Calcd. for $C_{15}H_{30}O_4P_2S_6$: C, 34.07; H, 5.76; P, 11.72. Found: C, 34.10; H, 5.70; P, 11.72.

EXAMPLE 5

Using the procedure of Example 4, 0.650 g. of 3,9-H-2,4,8,10 - tetraoxa - 3,9 - diphosphaspiro[5.5]undecane-3,9-disulfide was reacted with 0.665 g. of β-(methylthio)-ethyl thiocyanate. The resulting product was recrystallized from acetone and melted at 187°–188° C. The following analytical data revealed that 3,9-bis(β-[methylthio]ethylthio) - 2,4,8,10 - tetraoxa - 3,9 - diphosphaspiro[5.5]undecane-3,9-disulfide had been obtained. Yield: 93%.

Analysis.—Calcd. for $C_{11}H_{22}O_4P_2S_6$: C, 27.95; H, 4.69; P, 13.11. Found: C, 27.98; H, 5.28; P, 12.85.

EXAMPLE 6

Using the procedure of Example 4, 2.60 g. of 3,9-H-2,4,8,10 - tetraoxa - 3,9 - diphosphaspiro[5.5]undecane-3,9-disulfide was reacted with 3.0 g. of β-(ethylthio)ethyl thiocyaante. The resulting product was recrystallized from acetone and melted at 184°–185° C. The following analytical data revealed that 3,9-bis(β-[ethylthio]ethylthio)-2,4,8,10 - tetraoxa - 3,9 - diphosphaspiro[5.5]undecane-3,9-disulfide had been obtained. Yield: 87%.

Analysis.—Calcd. for $C_{13}H_{26}O_4P_2S_6$: C, 31.18; H, 5.23; P, 12.37; S, 38.43. Found: C, 31.21; H, 5.26; P, 12.46; S, 38.75.

EXAMPLE 7

In the manner described in Example 4, 2.60 g. of 3,9-H - 2,4,8,10 - tetraoxa - 3,9 - diphosphaspiro[5.5]undecane-3,9-disulfide was reacted with 2.94 g. of γ-(methylthio)propyl thiocyanate. The resulting product was recrystallized from acetone and melted at 169°–170° C. The following analytical data revealed that 3,9-bis(γ-[methylthio]propylthio) - 2,4,8,10 - tetraoxa - 3,9 - diphosphaspiro[5.5]undecane-3,9-disulfide had been obtained. Yield: 94%.

Analysis.—Calcd. for $C_{13}H_{26}O_4P_2S_6$: C, 31.18; H, 5.23; P, 12.37. Found: C, 31.22; H, 5.09; P, 11.96.

EXAMPLE 8

3.90 g. of 3,9-H-2,4,8,10-tetraoxa - 3,9 - diphosphaspiro[5.5]undecane-3,9-disulfide was reacted with 5.85 g. of β-(phenylthio)ethyl thiocyanate using the procedure of Example 4. The resulting product was recrystallized from dioxane and melted at 194°–195° C. The following analytical data revealed that 3,9-bis(β-[phenylthio]ethylthio) - 2,4,8,10 - tetraoxa - 3,9 - diphosphaspiro[5.5]undecane-3,9-disulfide had been obtained. Yield: 84%.

Analysis.—Calcd. for $C_{21}H_{26}O_4P_2S_6$: C, 42.26; H, 4.39; P, 10.38. Found: C, 42.19; H, 4.42; P, 10.38.

EXAMPLE 9

Using the procedure of Example 4, 1.30 g. of 3,9-H-2,4,8,10 - tetraoxa - 3,9 - diphosphaspiro[5.5]undecane - 3,9-disulfide was reacted with 2.295 g. of β-(p-chlorophenylthio)ethyl thiocyanate. The resulting product was recrystallized from dioxane and melted at 208°–209° C. The following analytical data revealed that 3,9-bis(β-[p-chlorophenylthio]ethylthio) - 2,4,8,10 - tetraoxa - 3,9 - diphosphaspiro[5.5]undecane-3,9-disulfide had been obtained. Yield: 81%.

Analysis.—Calcd. for $C_{21}H_{24}Cl_2O_4P_2S_6$: C, 37.89; H, 3.63; Cl, 10.6; P, 9.31. Found: C, 37.96; H, 3.66; Cl, 11.2; P, 9.09.

EXAMPLE 10

3.90 g. of 3,9-H-2,4,8,10-tetraoxa-3,9-diphosphaspiro[5.5]undecane-3,9-disulfide was reacted with 6.27 g. of γ-(phenylthio) propyl thiocyanate using the procedure of Example 4. The resulting product was recrystallized from dioxane-acetone and melted at 166°–167° C. The following analytical data revealed that 3,9-bis(γ-[phenylthio]propylthio) - 2,4,8,10 - tetraoxa - 3,9 - diphosphaspiro[5.5]undecane-3,9-disulfide had been obtained. Yield: 90%.

Analysis.—Calcd. for $C_{23}H_{30}O_4P_2S_6$: C, 44.21; H, 4.84; P, 9.91. Found: C, 43.90; H, 4.80; P, 9.88.

EXAMPLE 11

Using the procedure of Example 4, 1.30 g. of 3,9-H-2,4,8,10 - tetraoxa - 3,9 - diphosphaspiro[5.5]undecane - 3,9-disulfide was reacted with 2.435 g. of γ-(p-chlorophenylthio)propyl thiocyanate. The resulting product was recrystallized from benzene and melted at 152°–153° C. The following analytical data revealed that 3,9-bis(γ-[p-chlorophenylthio]propylthio) - 2,4,8,10 - tetraoxa - 3,9-diphosphaspiro[5.5]undecane-3,9-disulfide had been obtained. Yield: 86%.

Analysis.—Calcd. for $C_{23}H_{28}Cl_2O_4P_2S_6$: C, 39.82; H, 4.07; Cl, 10.2; P, 8.93. Found: C, 39.72; H, 4.01; Cl, 10.7; P, 8.81.

EXAMPLE 12

Using the procedure of Example 4, 1.30 g. of 3,9-H-2,4,8,10 - tetraoxa - 3,9 - diphosphaspiro[5.5]undecane - 3,9-disulfide was reacted with 1.19 g. of methylthiomethyl thiocyanate. The resulting product was recrystallized from acetone and melted at 169°–170° C. The following analytical data revealed that 3,9-bis([methylthio]methylthio) - 2,4,8,10 - tetraoxa - 3,9 - diphosphaspiro[5.5]undecane-3,9-disulfide had been obtained. Yield: 9%.

Analysis.—Calcd. for $C_9H_{18}O_4P_2S_6$: C, 24.31; H, 4.08; P, 13.93. Found: C, 24.57; H, 4.19; P, 13.60.

The bis-mercaptoalkylene spirophosphorodithioates of this invention are useful pesticides and are particularly effective as contact and systematic insecticides, acaricides and nemotocides.

Although the derivatives (I) can be utilized in a pure form in these application areas, it is more practical and convenient to utilize them in a dispersed form admixed with a major amount of a suitable carrier or extending agent. For example, a variety of insecticidal compositions including solutions, suspensions and emulsions of the active ingredient dispersed in a liquid carrier are provided as a result of this invention. Similarly the spirophosphorodithioates can be admixed in solid carriers to provide powders, dusts and granular compositions which are convenient to apply to areas where insect control is desired. The solid insecticidal compositions having the derivatives (I) as active ingredient also should preferably contain a small amount of a wetting agent so that aqueous dispersions of the powders, dusts, etc., which may be sprayed, can be prepared.

What is claimed is:

1. Bis-mercaptoalkylene spirophosphorodithioates having the formula $$RS-(CH_2)_n-S-\underset{\underset{S}{\parallel}}{P} \begin{pmatrix} O-CH_2 \\ O-CH_2 \end{pmatrix} \begin{pmatrix} CH_2-O \\ CH_2-O \end{pmatrix} \underset{\underset{S}{\parallel}}{P}-S-(CH_2)_n-SR$$

n being an integer from 1–3, and wherein R is selected from the class consisting of hydrogen, alkyl having 1–18 carbon atoms, alkenyl having 3–5 carbon atoms, alkoxyalkyl having 2–8 carbon atoms, cycloalkyl having 5–8 carbon atoms, aryl having 6–10 carbon atoms, aralkyl having 7–9 carbon atoms, aryloxyalkyl having 7–9 carbon atoms, chlorophenyl, bromophenyl, iodophenyl, dichlorophenyl and nitrated phenyl.

2. The bis-mercaptoalkylene spirophosphorodithioates of claim 1 wherein R represents an alkyl group having 1–18 carbon atoms.

3. 3,9-bis(γ-[ethylthio]propylthio) - 2,4,8,10tetraoxa-3,9-diphosphaspiro[5.5]undecane-3,9-disulfide.

4. 3,9-bis(β-[methylthio]ethylthio) - 2,4,8,10-tetraoxa-3,9-diphosphaspiro[5.5]undecane-3,9-disulfide.

5. 3,9-bis(β-[ethylthio]ethylthio) - 2,4,8,10-tetraoxa-3,9-diphosphaspiro[5.5]undecane-3,9-disulfide.

6. 3,9-bis(γ-[methylthio]propylthio)-2,4,8,10-tetraoxa-3,9-diphosphaspiro[5.5]undecane-3,9-disulfide.

7. 3,9-bis([methylthio]methylthio) - 2,4,8,10-tetraoxa-3,9-diphosphaspiro[5.5]undecane-3,9-disulfide.

8. The bis-mercaptoalkylene spirophosphorodithioates of claim 1 wherein R represents an aryl group having 6–10 carbon atoms.

9. The bis-mercaptoalkylene spirophosphorodithioates of claim 1 wherein R is phenyl.

10. 3,9-bis(β-[phenylthio]ethylthio) - 2,4,8,10 - tetraoxa-3,9-diphosphaspiro[5.5]undecane-3,9-disulfide.

11. 3,9-bis(γ-[phenylthio]propylthio) - 2,4,8,10 - tetraoxa-3,9-diphosphaspiro[5.5]undecane-3,9-disulfide.

12. The bis-mercaptoalkylene spirophosphorodithioates of claim 1 wherein R represents a chlorophenyl group.

13. 3,9-bis(β-[p-chlorophenylthio]ethylthio) - 2,3,8,10-tetraoxa-3,9-diphosphaspiro[5.5]undecane-3,9-disulfide.

14. 3,9-bis(γ-[p - chlorophenylthio]propylthio) - 2,4,8,10-tetraoxa-3,9-diphosphaspiro[5.5]undecane - 3,9 - disulfide.

15. A process for preparing bis-mercaptoalkylene spirophosphorodithioates which comprises reacting pentaerythritol bis-hydrogen thiophosphite with a mercaptoalkylene thiocyanate in an aliphatic carboxylic acid N,N-dialkyl amide solvent in the presence of a basic catalyst, and recovering said bis-mercaptoalkylene spirophosphorodithioates from the reaction mixture.

16. The process of claim 15 wherein an alkali metal alkoxide is employed as the catalyst.

17. The process of claim 15 wherein dimethylacetamide is employed as the solvent.

18. A process for preparing bis-mercaptoalkylene spirophosphorodithioates which comprises reacting pentaerythritol bis-hydrogen thiophosphite with a mercaptoalkylene thiocyanate in an aliphatic carboxylic acid N,N-dialkyl amide solvent, said reaction being performed at a temperature of less than about 50° C. in the presence of a catalytic amount of an alkali metal alkoxide, and recovering said bis-mercaptoalkylene spirophosphorodithioates from the reaction mixture.

19. The process of claim 18 wherein dimethylformamide is employed as the solvent.

20. The process of claim 18 wherein dimethylacetamide is employed as the solvent.

References Cited

UNITED STATES PATENTS 2,640,847  6/1953  Schrader _____ 260—970

FOREIGN PATENTS 785,141  10/1957  Great Britain.

CHARLES B. PARKER, *Primary Examiner.*

A. H. SUTTO, *Assistant Examiner.*